United States Patent [19]

Mauch et al.

[11] 3,874,097

[45] Apr. 1, 1975

[54] READING AID FOR THE BLIND

[75] Inventors: Hans A. Mauch; Glendon C. Smith, both of Dayton, Ohio; Richard Bennett, San Jose, Calif.

[73] Assignee: The United States of America as represented by the Veterans Administration of the United States Government, Washington, D.C.

[22] Filed: Jan. 8, 1973

[21] Appl. No.: 321,851

[52] U.S. Cl. .................................. 35/35 A, 250/555
[51] Int. Cl. ........................ G09b 21/00, G06k 9/13
[58] Field of Search .................... 35/35 A, 35 C, 1; 250/219 CR, 555, 239

[56] References Cited
UNITED STATES PATENTS

| | | | |
|---|---|---|---|
| 2,126,370 | 8/1938 | Doolittle | 35/35 C UX |
| 2,420,716 | 5/1947 | Morton et al. | 35/35 A X |
| 2,911,482 | 11/1959 | Dostert | 35/35 C X |
| 3,099,750 | 7/1963 | Swarthout et al. | 250/239 |
| 3,175,038 | 3/1965 | Mauch | 35/35 A X |
| 3,676,938 | 7/1972 | Trehub | 250/219 CR X |

*Primary Examiner*—Wm. H. Grieb
*Attorney, Agent, or Firm*—Jerome P. Bloom

[57] ABSTRACT

Appartus which is particularly useful in producing a reading aid for the blind, provides means for scanning printed material or images thereof and for translating the same into audible sound. Each sound is distinctive as to each letter, number, symbol or other graphic information embodied in the pattern of the printed material scanned. It features a compact scanning probe having a wide range magnification system which is in focus at all settings. Also embodied in the probe is a unique light reflector device, the light from which is so directed as to provide a uniform illumination of the area scanned. Due to the nature of the illumination and the precision of focus, a true visual image of the scanned material is presented to included photosensing means forming part of an electronic read out system which converts the image into an audible stereophonic reproduction of its visual pattern. The nature of this reproduction is such as to distinctively present the respectively different portions of an image to the left and right ears of a user of the invention apparatus. This facilitates the training of a user and enables the user to achieve a relatively high reading speed in a relatively short period of time.

27 Claims, 6 Drawing Figures

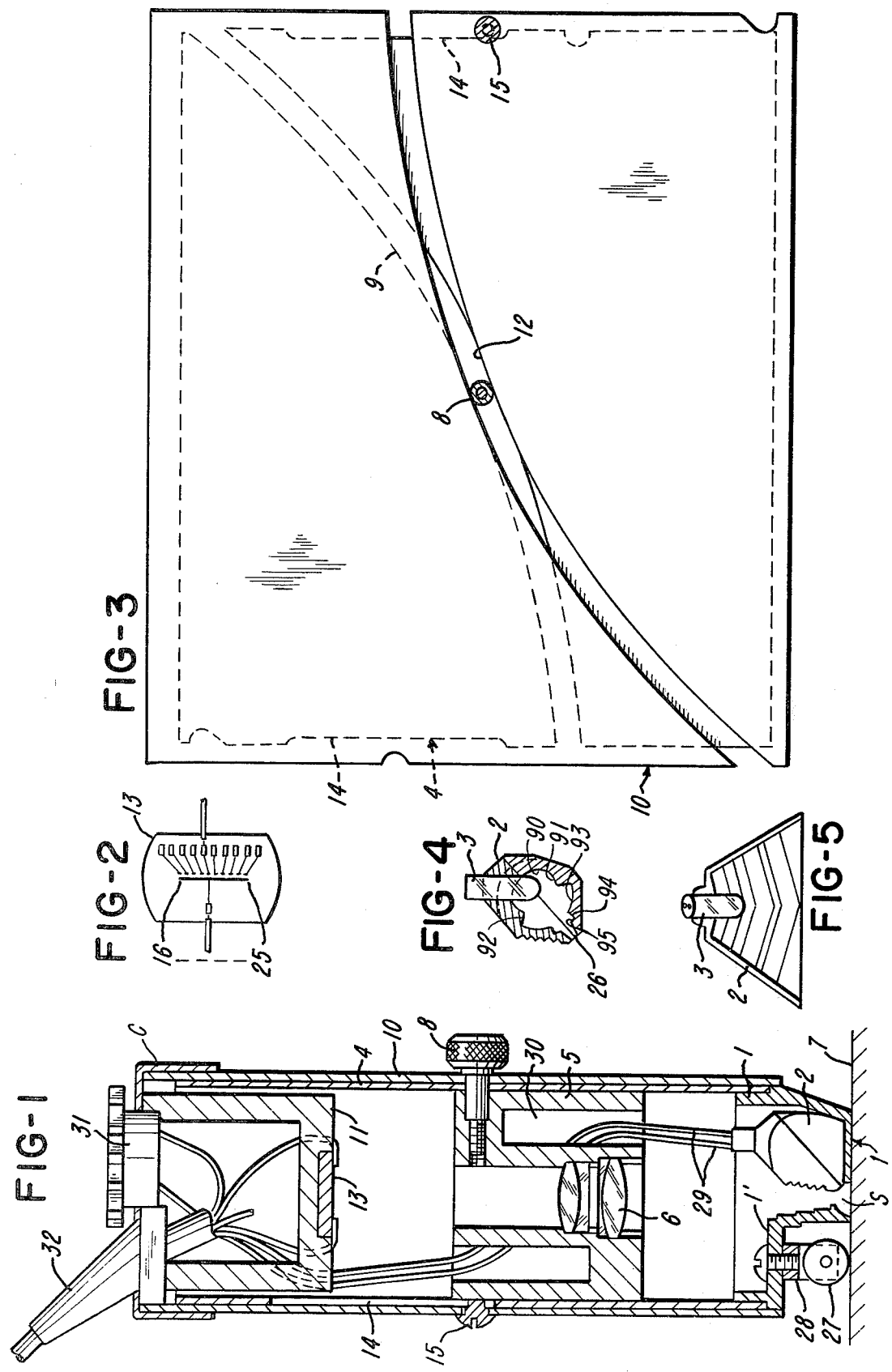

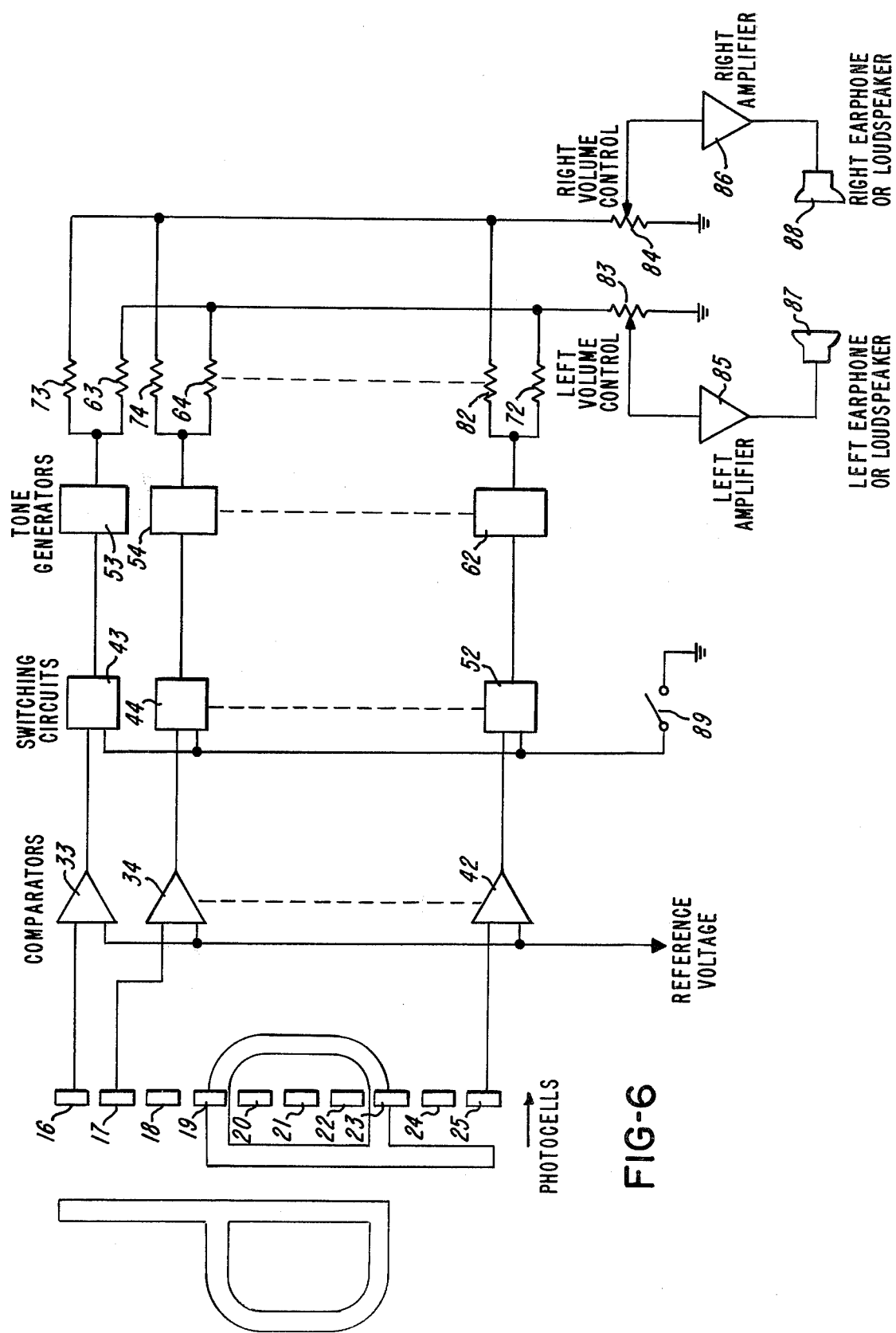

READING AID FOR THE BLIND

BACKGROUND OF THE INVENTION

This invention relates primarily, to a reading device for the blind. Elements thereof, however, are not so limited as to their application and such is obviously not intended.

There have, in the past, been a number of concepts applied to facilitate the reading of print and other symbols by the blind. It has been determined that if suitable optics are employed in scanning print and other graphic portrayals of intelligible characters that the same may be converted into sounds representative thereof. If an ear or ears of a blind person can become acclimated and conditioned to separate the sounds, from such a reading system some reading capability may be developed. Though this has been recognized for some time, the production of an efficient reading system of this nature has been difficult to achieve. This has been due, in part, to the problems encountered in efforts to achieve a good probe for optically scanning and sensing the print or other material that a blind person may desire to read. The optics heretofore employed have in some cases suffered from an inability to precisely focus on the printed material. In other cases the embodiments of the described concept have had a limited range of application. For example, the range of letter sizes which prior art probes have been able to accept has been restricted. Other limitations found in reference to prior art systems of the nature here contemplated have resulted from the fact that the sound transmission of a letter or other object scanned has been directed to only one ear of the user. In the cases where sound has been directed to both ears the system employed dictates that both ears will receive the same signal, adding nothing to comprehension. Added problems have derived from an inability to achieve a proper illumination of the letters and other print scanned. Some prior art systems are further objectionable in that they use excessive power for illumination necessitating the provision of an outside source of power. Where batteries have been employed to power a system, their operating life has been extremely limited.

In general, prior reading aids to the blind of the nature here described have been characterized by inefficient illumination of the scanned print and in particular a nonuniform illumination of the print. This has caused an inherent variation in the sensitivity of the optical probe employed, particularly where the print scanned may vary in size. The latter condition distorts the tone patterns which will be transmitted to represent the material scanned.

The sum total of the noted problems has made it quite difficult for a blind person to use a system of the character described and achieve a reasonable speed and accuracy in recognizing the material scanned.

SUMMARY OF THE INVENTION

The present invention provides a highly satisfactory solution to the problems above noted. Embodiments are characterized by simple but effective and particularly efficient means for converting print such as letters, numbers, symbols, and, in fact, any printed material that can be read by a sighted person, into distinctive tonal patterns facilitating a relatively speedy and accurate identification thereof by the ears of a blind person. Embodiments feature a unique arrangement for the stereophonic transmission of sound facilitating the conditioning of a user's ears to distinguish what might ordinarily be difficult to distinguish. Equally important is their adaptation enabling them to handle a wide range of letter sizes ranging, for example, from classified advertisements to large headlines. Embodiments are further characterized by a minimum requirement for energy and a highly efficient illuminating means. This last insures accuracy in transmission and fidelity in conversion of observed material into the required tonal patterns. As will be obvious the criteria established for the optical probe employed makes the same ideally suited not only for the described application but other applications as well.

A primary object of the invention is to provide reading aids for the blind and components thereof which are economical to fabricate, more efficient and satisfactory in use, adaptable to a wide variety of applications and unlikely to malfunction.

A further object of the invention is to provide a particularly efficient means for converting print such as letters, numbers, symbols and the like, and images thereof, into their own distinctive tonal patterns, facilitating their recognition by a blind person.

Another object of the invention is to provide an improved reading machine for the blind wherein printed matter is easily scanned and the objects scanned converted into a representative tonal output with a resulting stereophonic effect which is clearly distinctive and provides spatial tonal patterns which correspond to the spatial arrangement of the optically contrasting patterns of the material being scanned.

A further object of the invention is to provide a stereophonic reading aid for the blind having the capacity to be applied to a large variety of print sizes.

Another object of the invention is to provide an improved optical probe useful for scanning print and other graphic representations of objects or their images.

Another object of the invention is to provide an improved illuminating device useful in optical probes and the like.

An additional object of the invention is to provide a device particularly useful as a reading machine for the blind, and components thereof, possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein a preferred but not necessarily the only form of embodiment of the invention is illustrated, FIG. 1 is a vertical cross-sectional view of an optical probe in accordance with the invention;

FIG. 2 shows detail of a photocell array embodied in the device of FIG. 1;

FIG. 3 shows a lay-out pattern of the control tubes forming a housing for the probe of FIG. 1;

FIG. 4 is a cross sectional view of the reflector-lamp assembly employed in the probe;

FIG. 5 is a sectional view of the reflector-lamp assembly taken at right angles to the view shown in FIG. 4; and FIG. 6 is a schematic showing of the invention system embodying the apparatus shown in FIGS. 1–5.

Like parts are indicated by like numerals in the drawings.

As seen in the drawings, the scanning probe of the invention includes a cup-like base 1 inserted in and integrated with the lower end of a cam tube 4. The assembly of the base 1 and tube 4 is housed, immediately above the bottom portion of the base 1, in a control tube 10. The tube 10 is non-rotatively mounted on and for movement vertically of the tube 4, as and for purposes to be further described.

A cap C covers the upper end of the tube 4 and supports a rheostat 31 and a cable guide 32. Extending through the latter are electric cables 29.

Fixed in connection with the cap C and depending within and in a concentrically spaced relation to tube 4 is a cuplike structure 11. The bottom and lowermost surface of the structure 11 mounts a plate 13 which incorporates an array of photo-cells numbered from 16 through 25. The photo-cells are arranged in a straight line which is at right angles to the direction the probe will be moved in a scanning procedure. The length of this line will correspond to the maximum vertical dimension of the images of printed material that the photo-cell array will be called upon to scan.

Positioned below, spaced longitudinally from and in axial alignment with the photo-cells is a pair of axially spaced lens elements 6 centered in a lens holder 5. The holder 5 is formed with a passage for the cables 29, the lower ends of which are connected to a lamp unit 3. The latter is mounted in the upper end of the interior of a reflector 2 positioned in the leading portion of the base 1.

The base 1 will, in use of the probe as a reading aid for the blind, seat flatly to a reading surface 7 and be moved thereon in a line of travel which is determined by the line of the printed material to be scanned. At what may be termed its trailing edge, the base 1 has a vertically offset portion 1'. Fixed to depend from the portion 1' is a bracket 28, the lowermost portion of which pivotally mounts a roller 27. In movement of the probe, the roller 27 which has a high friction coating will be moved over the reading surface on the line of scan. The bracket 28 is so mounted as to permit its rotative adjustment and thereby the rotative adjustment of the probe relative the roller. The purpose of this will soon be obvious.

Other than for its offset portion, the base 1 has a flat bottom which seats on and positions in sliding relation to the reading surface 7. At the limit of its flat bottom adjacent its offset, the base 1 has a limited opening S which extends transverse to the scanning path of the probe and is limited in its dimension in a fore and aft sense, as related to the scanning path. The opening S is in direct alignment with an opening 26 in the reflector 2. The shape of the reflector 2 resembles that of a clam shell and it is so oriented that the central plane thereof is inclined to the base 1 and is directed through the opening 26. It is noted that the portions of the lamp 3 which provides the source of illumination also lie in this plane at the edge portion thereof which is remote from the opening 26. Openings S and 26 are generally complementary so as to limit the direction for passage from the reflector of the light generated by the lamp 3.

As may be seen from FIG. 5 of the drawings, from the portion mounting lamp 3, the side edges of the reflector diverge symmetrically from its longitudinal axis to give the reflector a fan-shaped outline, in plan view. The inner surface of the reflector has a similar outline and is particularly designed to achieve a maximum usage of the light directed from the lamp 3. The surface portion 90 of the reflector, to the rear of the lamp 3 has a generally semi-elliptical configuration. As shown in FIG. 4 of the drawings, the ends of this elliptical curve are continued by short identical arc formed deflector wall portions 91 having a uniform radius as determined by the center of the lamp. The ends of arcs 91 are continued by symmetrical divergent wall portions 92, the extremities of which connect to the outer ends of additional arcuate reflecting wall portions 93 having a radius as determined by the center of the lamp. The projected extremities of wall portions 93 are connected to divergent outwardly projected wall portions 94. At their projected extremities wall portions 94 connect to additional arcuate reflective wall portions 95 formed on a uniform radius as determined by the lamp center. The wall portions 95 merge with the inner ends of short divergent wall portions defining the opening 26.

As may be readily observed the nature of the interior of the reflector 2 is such to direct the light from the lamp 3 with maximum intensity, in a path to exit from the reflector 2 within the area of the opening 26. To be more specific any light not immediately in line with the opening 26 or reflected from the elliptical surface 90 will be caught and reflected by the arcuate surfaces of wall portions 91, 93 and 95 in a sense to be bounced back against the elliptical surface 90 and angled back by its reflective surface to concentrate in the area of the opening 26. Referring to FIG. 5 of the drawings the described wall surfaces within the reflector 2 are identical to either side of its central axis. In other words, as provided by the reflector surface configuration the light from the single lamp 3 is directed and redirected from the 180° elliptical surface behind the lamp to pass the total through the opening 26. The circular arc segments of the interior surface of the reflector cover most of the remaining 180° angle which would close the 180° elliptical surface, so as to most effectively redirect and transmit the light which does not in the first instance pass through opening 26. The angularity of the deflector interior walls are carefully chosen to insure uniform illumination over the length and width of the opening 26. For most efficient operation the inner surfaces of the reflector should be mirror smooth and plated with bright gold.

Returning to the detail of the tubes 4 and 10, the tube 4 is formed to include a helical slot 9 while the control tube 10 is formed with a helical slot 12. From FIG. 3 of the drawings it may be seen the slots 9 and 12 have the same shape but one is rotated 180° relative the other. The tube 4 has a further vertical slot 14 extending about half its length, from the top down. A pin 15 is thrust into and through an aperture in the tube 10 to project within the slot 14 in the tube 4. The pin 15 is used to prevent the relative rotation of the tubes 4 and 10, one relative the other, while permitting the axial or vertical adjustment of the tube 10 relative the tube 4.

The probe includes a magnification adjustement knob 8 which has an enlarged head, pin-like body portion and a threaded extremity. In assembly thereof, the pin-like body portion of knob 8 is disposed within the slots 9 and 12, while the head portion is exterior to the tube 10 and the threaded extremity is engaged in an upper side portion of the lens holder 5. Due to the rotational displacement of slots 9 and 12, irrespective of either direction that the adjustment knob 8 is moved, from the central position shown in FIG. 3, after it is freed from a lock to tube 10 by a slight unscrewing thereof, the tube 10 is moved up and the lens holder 5 moved up or down relative the reading surface 7 and the photocell array 13. The relative proportional movements are, of course, determined by the relative curve of the slots 9 and 12. In moving the knob 8 after freeing the same and lens holder 5, the pin 15, slot 14 arrangement insures the relative vertical adjustment of tubes 4 and 10 as previously noted. Thus, with reference to FIG. 3 it may be seen that the overall height of the optical probe will vary with the magnification adjustment. It is a minimum at unity magnification (1x) and becomes longer for reducing or enlarging ratios.

A compact and practical design in accordance with the invention particularly results from spreading and desired magnification range in such a manner that the maximum magnification is equal to the square root of the range and the minimum magnification (a reduction) is equal to the reciprocal of the square root of the range. For example, the slots shown in FIG. 3 were taken from a probe with a 10 to 1 magnification range, that is, with respect to letters ranging from 0.750 inch high to 0.075 inch high, and the maximum magnification is equal to the square root of 10 which is about 3.16. The minimum magnification is 1/3.16 or 0.316 times. The probe is the same height at each extreme of the range. A further practical advantage is produced by the arrangement described. In FIG. 3, as noted previously, it can be seen that the slots 9 and 12 in the two tubes 4 and 10 respectively have the same shape and have only been rotated by 180°. This means that the slots can be cut in both tubes with the same fixtures and tools which need only allow for the different diameters and orientation.

In use of the above described probe in a reading aid for the blind, the same is oriented perpendicular to the plane of the reading surface 7. This positions the photo-cells 16–25 parallel to such surface. The roller 27 is caused to ride on surface 7 in the direction of scan, and for example, over a line of printed material. The photo-cells 16–25 are disposed thereby in line or column perpendicular to the line of scan, in which orientation they extend over the height of each letter of print or other printed material scanned. By suitable adjustment of the probe, in respect to the position of the lens elements 6, and the photo-cell array 13 relative the reading surface 7, the letters or other material scanned have their images enlarged or reduced, as required, to provide they always have the same size as they are presented to the photo-cells 16–25. In the embodiment illustrated the lamp-reflector assembly employed provides an illumination in the area scanned which is somewhat greater than 3.16 times the overall dimensions of the line of photo-cells.

In practice therefore, as the probe is vertically oriented, the base 1 is in sliding contact with surface 7 and use of the single roller enables its direction and adjustable control. For example, the body of the probe may be turned relative the roller to facilitate accurate scanning and read out of slanted letters, such as italics. If a user desires free motion of the probe, in moving the same, he can manually apply more force to the roller side of the probe and vice versa. In any case the primary moving force applied to the probe will be directed through the single roller. Thus, the roller arrangement provides an adjustable control over the resistance to the probe movement. Even more than this, its arrangement in conjunction with the form of base 1 puts the reflector for lamp 3 close to the precise area it is desired to illuminate. This avoids waste of available light and minimizes the energy requirement to support the operation of the probe. As the lamp 3 is electrically in series with the rheostat 31 and the included power source (which may be a simple battery), the rheostat can be adjusted to vary the illumination provided for the degree of magnification, the reflectivity of the background, and the sensitivity of the photo-cells involved in the probe system.

From the top of the probe, flexible cable guide 32 directs wires 29 from the photo-cells 16–25 and the lamp 3 and rheostat 31 to a related control box (not shown) which contains the electronic circuits for stereophonic read out and the power source for the system which need be no more than a rechargeable battery in this instance. For convenience, this box contains storage space for the probe and might be suspended over the user's chest from a neckstrap.

FIG. 6 of the drawings illustrates the electronic read out system embodied in conjunction with the described probe. This system is designed to receive a signal from the photo-cell array 13 as the base 1 is moved over each letter in a line of print, for example, during a scanning procedure. FIG. 6 shows the probe moving from left to right on the surface 7 and array 13 passing over the lower case letter *p*.

The photo-cells 16–25 are respectively shown as each being connected to one of a series of related comparators 33–42 which are in turn connected to suitable means defining a reference voltage. Each of the comparators are also connected to a switching circuit, the latter corresponding in number to the comparators and, as shown, numbered respectively from 43 to 52. A ground lead connected to the switching circuits incorporates a normally open switch 89 the purpose of which will be further described.

In movement of the probe over the letter *p*, as shown, successive portions of the image of the letter, depending on its configuration, will cover certain photo-cells or parts thereof. The photo-cells will in the course of scanning apply signals corresponding to the observance or lack of observance of letter portions to the connected comparators. The latter, upon receipt of a signal, will compare the same to the reference voltage. For each photo-cell sufficiently covered by a letter portion at any one time, the receipt by the corresponding comparator of the appropriate signal causes it to send a binary signal meaning "black" to the connected switching circuit. In the case and with the letter *p* positioned as illustrated in FIG. 6, such signals will originate from the photo-cells 19 and 23. As a switching circuit related to the comparator signalling "black" receives such signal, it turns on a connected one of a series of tone generators 53 to 62. The so energized tone generator produces an audible tone which may be a musical note.

It is noted that by closing the switch 89 one can reverse the method of operation of the switching circuits where the probe is scanning light print on a dark background. In such case the tone patterns will similarly correspond to the observed print.

From FIG. 6, it will be seen that each of the tone generators 53–62 supplies two resistors arranged in separate channels, one corresponding to a left sound channel directed to the left ear of the user of the probe and the other to a right sound channel directed to the right ear of the user. The resistors 63–72 in the left channels are selected to have a value to determine the relative amplitudes of tones directed in the left sound channels and consequently the sounds applied to the left ear. Resistors 73–82 perform similarly in respect to the right ear of the user. As seen, volume controls 83 and 84 are used to adjust the applied sounds to the desired level and to balance the two outputs which are presented through amplifiers 85 and 86 respectively to left and right ear phones or loud speakers 87 and 88.

In the example illustrated, the arrangement preferred is one to provide that a letter portion projected on photocell 25, causes a tone of 440Hz, which is the musical note A above middle C, to be produced loudly in the left ear and about 26 decibels less loudly in the right ear. The tones representative of each following cell from 24 to 16 will increase in pitch by the factor of the third root of two up to 3520Hz which is the tone produced when photo-cell 16 is darkened. This tone sounds loudly in the right ear and about 26 decibels less loudly in the left ear. These differences in loudness make the low pitch tone 440Hz associated with photocell 25 appear to come wholly from the user's left and the high pitch tone 3520Hz associated with photo-cell 16 appears on the right. Tones between these extremes have apparent spatial origins which are spread uniformly from one side to the other. In reading, the user can imagine the letters being likewise spread and thus utilize his experience in stereophonic listening to assist in rapid recognition of the tonal patterns and the spatial patterns which produce them.

For purposes of illustration, the tone generators 53–62 are shown as individual units, such as sine wave oscillators. It is to be understood that other wave forms and other means of production, for example, digital division from a master oscillator followed by wave shaping controlled by a read-only memory, can be used. Likewise, the switching circuits could be analog tupes located between the amplitude adjusting resistors 63–72 and 73–82 and the generators, which could operate continuously. Also, satisfactory stereophonic effects may be produced by using frequency dependent networks associated with the amplifiers 85 and 86, instead of the amplitude adjusting resistors.

It is now obvious that the invention provides a highly effective relatively simple scanning probe having a wide range of receptivity and one which reduces or enlarges each image received to a uniform size which can be handled by a relatively small single column array of photo-cells. More than that, the stereophonic read out of the images received are such to give high fidelity results facilitating recognition of the visual patterns scanned to a degree not heretofore provided.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

Having this described our invention, We claim:

1. Apparatus for use in scanning and translating objects scanned into audible sound, comprising a scanner device embodying means for observing visually perceptive patterns, means connected with said observing means to produce a signal or signals composed of a tone or tones, and combinations thereof, arranged to correspond to the shape of the visually perceptive pattern observed and to change in correspondence with changes in its observed shape, means defining two separate channels for separately receiving and transmitting the said tone or tones, or combinations thereof making up said signal or signals, means in at least one of said channels for modifying the amplitude of individual tones of said signal or signals by different proportions, volume control means in at least one of said channels for modifying the amplitudes of all tones of said signal or signals in said channel by a common porportion, and output means connected to each of said channels to separately direct the output from one of said channels to one ear of a user of said apparatus and the output from the other of said channels to the other ear of the user.

2. Apparatus as in claim 1 characterized by said scanner device including a lens unit directable to the visually perceptive pattern scanned, a photo-sensitive means for receiving the image of the visually perceptive pattern by way of said lens unit and means associated with said lens unit providing for the normalization of the various images as received by said photo-sensitive means so the size thereof presented to said photo-sensitive means will be uniform.

3. Apparatus as in claim 2 wherein said lens unit and photosensitive means are housed in a pair of tubular elements and said means associated with said lens unit is operatively related to said tubular elements to provide for the images of the patterns scanned to be rendered uniform as to their size in presentation thereof to said photosensitive means.

4. Apparatus for use in scanning and translating objects scanned into audible sound, comprising a scanner device embodying means for observing visually perceptive patterns and means for transmitting a relatively precise image thereof, and means for converting said image into representative stereophonic tonal patterns specifically distinctive of each visual pattern scanned, said scanner device being characterized by lens means directable to the visually perceptive patterns scanned, and photo-sensitive means for receiving the image of the visually perceptive patterns by way of said lens means, said lens means and photo-sensitive means being housed in a pair of tubular elements and said tubular elements having complementary slots and means in connection with said lens means movable in said slots to relatively adjust the spacing between the photosensitive means and said lens means and the spacing between said lens means and the object scanned to provide the desired presentation of images of the scanned patterns to said photosensitive means.

5. Apparatus as in claim 4 wherein the said means in connection with said lens means is a control means and said slots are so formed and related that on movement of said control means said lens means will move therewith and one of said tubes will be moved relative the other in an axial sense.

6. Apparatus as in claim 4 wherein said slots in said tubes are identical but one thereof is displaced 180° from the other in assembly of said tubes.

7. Apparatus for use in scanning and translating objects scanned into audible sound, comprising a scanner device embodying means for observing visually perceptive patterns and means for transmitting a relatively precise image thereof, and means for converting said image into representative stereophonic tonal patterns specifically distinctive of each visual pattern scanned, said scanner device being in the nature of a probe having means for positioning it generally vertical to a surface scanned which contains visually perceptive patterns, the base of said probe including a portion seating flat to said surface to be scanned and a portion which mounts a single roller facilitating its movement over said surface, said base portion seating to said surface including an elongated aperture with its elongation transverse to the direction of scan and aligned with said observing means, means in said probe for directing light in angles to cause the same to be angularly directed to and through said aperture and concentrated on the particular area of said surface exposed to said aperture in movement of said probe, said light being arranged immediately adjacent said aperture, and a reflector shell for said light which has a clamp shape and an opening to said aperture at one edge portion thereof remote from said light, said opening being in line with the source of said light, and a reflective wall provided in said reflector, portions of which are disposed to either side of said line and arcuately formed to redirect light therefrom to angle the same back to the line of emission from said light source and to said opening from the reflector.

8. Apparatus for use in scanning and translating objects scanned into audible sound comprising a scanner devicie embodying means for observing visually perceptive patterns and transmitting signals representing a relatively precise image thereof, means for convverting said signals into sound in the form of representative tonal patterns specifically distinctive of each visual pattern scanned and means for directing the output of constituent tones of said tonal patterns to the respective ears of the user of said apparatus at different amplitudes to produce a stereophonic effect, said means for converting said image signals and for directing the output of resulting tonal patterns to the ears of a user including means arranged to increase the amplitudes of tones in one ear of a user and decrease them in the other ear as tones progress from low to high pitch corresponding to lower or upper parts of the visually perceptive patterns scanned, where the visually perceptive patterns are letters, numbers and the like.

9. A sensing probe useful in scanning and transmitting signals indicative of the material scanned comprising a housing adapted to be positioned on the vertical to an area to be scanned which contains visually perceptive patterns, the base of said probe including a portion seating flat to a surface representing the area to be scanned, said base including an elongated aperture with its elongation transverse to the direction of scan, said housing embodying a lens unit in alignment with said aperture and in axially spaced relation thereto, means defining a column of photo-sensitive means and means included in said housing to provide for the relative adjustment of the spacing of said photo-sensitive means, said lens unit and said aperture in a manner to enable that the image of a visually perceptive pattern scanned will be presented to the photo-sensitive means in a uniform size.

10. Apparatus as in claim 9 wherein said lens unit and photo-sensitive means are housed in a pair of tubular elements having means interrelating them to provide for the images of the patterns scanned to be rendered uniform as to their size in presentation thereof to said photosensitive means.

11. Apparatus as set forth in claim 9 characterized by means including a single roller adjustably connected to said housing and adapted to seat on the surface representing the area being scanned in a manner to facilitate the movement of the probe over such surface in a direction to properly orient said aperture with reference to the visually perceptive patterns whereby to determine that said photosensitive means will move at a correct angle to the direction of scan of said patterns.

12. Apparatus as set forth in claim 9 characterized by light emitting means contained in said housing and within said base immediately adjacent said aperture, said light emitting means being arranged to provide a concentration of emitted light to be directed through said aperture and to the visually perceptive pattern as presented at said surface.

13. Apparatus as in claim 12 characterized by said light emitting means including a light source contained in a reflector shell having a clam shape and a reflective surface embodied therein about said light source including an elliptical surface to the rear of said light source and beyond said elliptical surface and to either side of a line from the light source to said aperture a plurality of arcuate reflective wall surfaces at longitudinally spaced locations with respect to the line the center of which arcuately formed wall surface portions is generally coincident with the center of the light source.

14. A sensing probe useful in scanning and transmitting signals indicative of the material scanned comprising a housing adapted to be positioned on the vertical to an area to be scanned which contains visually perceptive patterns, the base of said probe including a portion seating flat to a surface representing the area to be scanned, said base including an elongated aperture with its elongation transverse to the direction of scan, said housing embodying a lens unit in alignment with said aperture and in axially spaced relation thereto, means defining a column of photo-sensitive means in spaced relation to said lens unit, said lens unit and said photo-sensitive means being further housed in a pair of tubular elements, said tubular elements having complementary slots, and means in connection with said lens unit movable in said slots to relatively adjust the spacing between the photo-sensitive means, said lens unit and said aperture to provide the desired presentation of the images of the scanned pattern to said photosensitive means.

15. Apparatus as in claim 14 wherein the said means in connection with said lens unit is a control means and said slots are so formed and related that on movement of said control means said lens unit will move therewith and one of said tubes will be moved relative the other in an axial sense.

16. Apparatus as in claim 14 wherein said slots in said tubes are identical but one thereof is displaced 180° from the other in assembly of said tubes.

17. A light emitting device for use in scanning probes and like application comprising a housing having a generally clamp shape configuration at one edge portion of which is a slit-like aperture which is laterally extended and at an opposite interior portion of which is mounted a light source, the interior wall of said housing being of a generally reflective character and identically formed to either side of a plane including said light source and said aperture, opposite wall portions of said reflector to either side of said plane including arcuately formed spaced segments the center of the radius of which is coincident with said light source.

18. A device as in claim 17 characterized by said housing having a fan-shape in plan view and the interior wall surface of which has sides which relatively diverge from adjacent and to the rear of the light source to the terminal points which define the lateral extent of said aperture.

19. Apparatus for use in scanning and translating objects scanned into audible sound comprising a scanner device embodying means for observing visually perceptive patterns and transmitting a signal or signals representing a relatively precise image thereof, means for converting said signal or signals into sound in the form of representative tonal patterns specifically distinctive of each visual pattern scanned, means for separately transmitting each constituent tone of said tonal patterns to each of two separate channels, means in said channels for modifying the amplitude of individual tones of said tonal patterns by different proportions to produce a sterephonic effect, volume control means in each of said channels for modifying the amplitudes of all the tones in a channel by a common proportion, and output means connected to each of said channels to separately direct the output from one of said channels to one ear of a user of said apparatus and the output from the other of said channels to the other ear of the user.

20. Apparatus as in claim 19 characterized by said converting and directing means being arranged to provide that the frequency content as well as the differing amplitudes of the tones in the tonal patterns received by the respective ears of the user are effective to create apparent spatial origins of the tones which are spread from one side of the user to the other.

21. Apparatus as in claim 20 characterized by means providing that said apparent spatial origins of tones in said tonal pattern correspond to the spatial arrangement of the visually perceptive patterns being scanned.

22. Apparatus as in claim 19 wherein said observing means include means defining a wide range magnification system at all settings.

23. Apparatus as in claim 19 characterized by said scanner device being in the nature of a probe which has means positioning it generally vertical to a surface scanned which contains visually perceptive patterns, the base of said probe including a portion seating flat to said surface to be scanned and a portion which mounts a single roller facilitating its movement over said surface, said base portion seating to said surface including an elongated aperture with its elongation transverse to the direction of scan and aligned with said observing means.

24. Apparatus as in claim 23 characterized by means in said probe for directing light in angles to cause the same to be angularly directed to and through said aperture and concentrated on the particular area of said surface exposed to said aperture in movement of said probe, the source of said light being arranged immediately adjacent said aperture.

25. Apparatus as in claim 19 wherein said observing means includes lens means and an array of photo cells arranged in a single column, said array being axially aligned with said lens means and means which interconnect said lens means and said photo cells for movement thereof, one relative the other, to determine that the size of the visually perceptive patterns observed will be uniform as presented to said array of photo cells.

26. Apparatus as in claim 25 characterized in that each of said photo cells has in connection therewith electrical comparator means, switching circuit means and tone generator means, said comparator means comparing the electrical signal from the connected photo cell with a reference electrical signal and whenever the results of this comparison are indicative of the associated photo cell being sufficiently covered by a letter portion said comparator means transmitting a control signal to said switching circuit means which thereupon activates said tone generator means which thereupon produces a tone which is transmitted into both of said channels.

27. Apparatus for scanning and translating objects scanned into audible sound, comprising a scanner device embodying means for observing visually perceptive patterns, means connected with said observing means to produce a signal or signals, composed of tones or combinations thereof, arranged to correspond to the shape of the visually perceptive pattern observed and to change in correspondence with changes in its observed shape, and means for directing the same said signal or signals into separate channels at least one of which is directed to the left ear of the user and at least one of which is directed to theright ear of the user, and at least one of said channels including means to change the amplitudes of said tone or tones individually in movement therethrough to provide that the respective ears of the user receive different acoustic signals corresponding to the same visually perceptive pattern, and volume control means included in the channels directed to at least one ear of the user to balance the loudnesses of said acoustic signals without changing the relative amplitudes of tones within each acoustic signal.

* * * * *

UNITED STATES PATENT OFFICE
CERTIFICATE OF CORRECTION

PATENT NO. : 3,874,097
DATED : April 1, 1975
INVENTOR(S) : Hans A. Mauch; Glendon C. Smith; Richard Bennett It is certified that error appears in the above-identified patent and that said Letters Patent are hereby corrected as shown below:

Col. 3, line 23, "corporate" is corrected to read -- corporates --.

Col. 5, line 48, -- a -- is inserted after "in".

Col. 6, line 39, "he" is corrected to read -- the --.

Col. 7, line 46, "tupes" is corrected to read -- types --.

Col. 9, line 35, "clamp" is corrected to read -- clam --.

Col. 11, line 10, "clamp" is corrected to read -- clam --.

Signed and sealed this 1st day of July 1975.

Attest:

RUTH C. MASON
Attesting Officer

C. MARSHALL DANN
Commissioner of Patents
and Trademarks